US011054933B2

(12) United States Patent
Jen et al.

(10) Patent No.: US 11,054,933 B2
(45) Date of Patent: Jul. 6, 2021

(54) TOUCH SENSOR CIRCUIT AND TOUCH SENSOR METHOD

(71) Applicant: Silicon Integrated Systems Corp., Hsinchu (TW)

(72) Inventors: Ching-Lin Jen, Hsinchu (TW); Ssu-Che Yang, Hsinchu (TW); Chia-Yi Chu, Hsinchu (TW); Chung-Lin Chiang, Hsinchu (TW); Yao-Jui Chang, Hsinchu (TW); Keng-Nan Chen, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 24 days.

(21) Appl. No.: 16/198,145

(22) Filed: Nov. 21, 2018

(65) Prior Publication Data

US 2019/0155441 A1 May 23, 2019

(30) Foreign Application Priority Data

Nov. 22, 2017 (TW) .................................. 106140603

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/041662* (2019.05); *G06F 2203/04104* (2013.01)

(58) Field of Classification Search
CPC .................................. G06F 3/041; G06F 3/044
See application file for complete search history.

(56) References Cited

U.S. PATENT DOCUMENTS

| 9,575,599 B1 * | 2/2017 | Wilson | .................... G06F 3/044 |
|---|---|---|---|
| 2011/0050620 A1 * | 3/2011 | Hristov | ................. G06F 3/0418 345/174 |
| 2016/0117014 A1 * | 4/2016 | Davison | ............... H03K 17/962 345/174 |
| 2016/0170551 A1 * | 6/2016 | Lee | ........................ G06F 3/0416 345/174 |
| 2017/0285832 A1 * | 10/2017 | Lee | ........................ G06F 3/0414 |

* cited by examiner

*Primary Examiner* — Chanh D Nguyen
*Assistant Examiner* — Nguyen H Truong
(74) *Attorney, Agent, or Firm* — Muncy, Geissler, Olds & Lowe, P.C.

(57) ABSTRACT

A circuit for touch sensing includes a driving unit, a self-capacitive sensor circuit, a mutual-capacitive sensor circuit and a control circuit. The driving is configured to generate a driving signal. The self-capacitive sensor circuit is configured to generate a self-capacitance sensing result. The mutual-capacitive sensor circuit is configured to receive the driving signal in order to generate a mutual-capacitance sensing result when the voltage of a node between the self-capacitive sensor circuit and the mutual-capacitive sensor circuit reaches a reference voltage. The control circuit receives and computes the self-capacitance sensing result and the mutual-capacitance sensing result in order to generate a sensing result. By utilizing the circuit for touch sensing of present disclosure, the accuracy and the efficiency of touch sensing can be enhanced.

10 Claims, 3 Drawing Sheets

TOUCH SENSOR CIRCUIT AND TOUCH SENSOR METHOD

FIELD OF INVENTION

The present disclosure relates to a method for touch sensing and, more particularly, to a touch sensing method for implementing mutual-capacitive and self-capacitive sensing at the same time.

BACKGROUND OF INVENTION

Multi-touch has become an essential function for commercial electronic devices in markets. Self-capacitive touch sensing and mutual-capacitive touch sensing are two kinds of main touch detection methods. Due to the characteristics of mutual-capacitive touch sensing, it is more suitable for use in multi-touch than self-capacitive touch sensing, thus, mutual touch sensing is widely applied to touch display screens.

However, mutual-capacitive touch sensing is easily affected by environment, such as wet fingers of users, humidity or temperature of atmosphere, drop or spot on screen, etc. These environmental affections cause wrong or inaccurate detection results.

In contrast, self-capacitive touch sensing is hardly affected by environment but cannot implement multi-touch sensing. As a result, current multi-touch sensing screens usually utilize both mutual-capacitive and self-capacitive touch sensing to perform multi-touch sensing and prevent from being affected by the environment so that the accuracy of touch detection can be improved. Electronic devices execute mutual-capacitive touch sensing and self-capacitive touch sensing separately and compute multi-touch sensing result according to the detection of mutual-capacitive touch sensing and self-capacitive touch sensing. However, the execution duration of touch sensing must increase due to performance of both mutual-capacitive and self-capacitive touch sensing. The operation efficiency may be affected and become slower.

Therefore, a touch detection method which can perform mutual-capacitive touch sensing and self-capacitive touch sensing at the same time is required so that t multi-touch sensing can be implemented and the accuracy can be improved, in the meanwhile, the detection duration can be reduced and the operation speed of devices can be increased.

SUMMARY OF INVENTION

The present disclosure provides a touch sensor circuit includes a driving circuit, a self-capacitive sensor circuit, a mutual-capacitive sensor circuit, and a control circuit. The driving circuit configured to generate a driving signal. The self-capacitive sensor circuit is configured to generate a self-capacitive sensing result. The mutual-capacitive sensor circuit is configured to generate a mutual-capacitive sensing result after receiving the driving signals when a voltage of a node between the self-capacitive sensor circuit and the mutual capacitive sensor circuit reaches a reference voltage. The control circuit is configured to generate a sensing result according to the self-capacitive sensing result and the mutual-capacitive sensing result.

The present disclosure provides a touch sensor method includes charging a node between a mutual-capacitive sensor circuit and a self-capacitive sensor circuit, and implementing a self-capacitor detection during charging the node. Obtaining a voltage variation of a first capacitor by detecting the first capacitor by utilizing the self-capacitive sensor circuit. Obtaining an output voltage of a second capacitor by detecting the second capacitor by utilizing the mutual-capacitive sensor circuit when a voltage of the node between a mutual-capacitive sensor circuit and a self-capacitive sensor circuit reaches a reference voltage. Obtaining a sensing result according to the voltage variation and the output voltage.

By utilizing the sensor circuit and sensor method of the present disclosure, self-capacitive touch sensing implements during charging to the mutual-capacitive sensor circuit, thus self-capacitive touch sensing and mutual-capacitive touch sensing can implement at the same time. So that the accuracy of multi-touch sensing is enhanced and the environmental affection is reduced. The duration of touch sensing is shorten and the efficiency of touch sensing are improved.

DETAILED DESCRIPTION OF PREFERRED EMBODIMENTS

The illustrations of the following embodiments take the attached drawings as reference to indicate the applicable specific examples of the present disclosure. The mentioned directional terms, such as upper, lower, front, back, left, right, inner, outer, side, etc., are only directions by referring to the accompanying drawings, and thus the used directional terms are used to describe and understand the present invention, but the present invention is not limited thereto.

Figure 1:
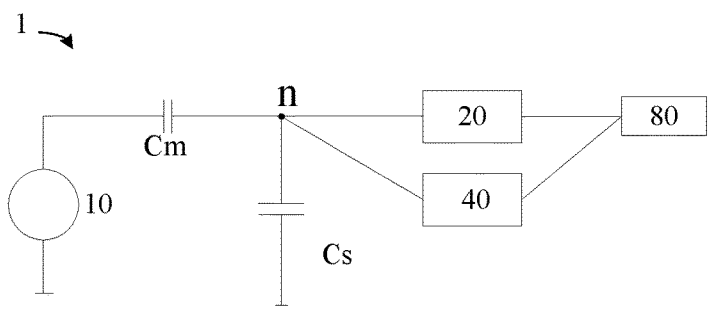
FIG. 1 illustrates a touch sensor circuit of a first embodiment of the present disclosure.

Please refer to FIG. 1 which illustrates the touch sensor circuit of the present disclosure. The touch sensor circuit 1 includes a driving circuit 10, a mutual-capacitive sensor circuit 20, a self-capacitive sensor circuit 40 and a control circuit 80. The driving circuit 10 is configured to generate a driving signal. The mutual-capacitive sensor circuit 20 performs mutual-capacitive touch sensing and generates a mutual-capacitive sensing result. The self-capacitive sensor circuit 40 performs self-capacitive touch sensing and generates a self-capacitive sensing result. The control circuit 80 computes the output results of the mutual-capacitive sensor circuit 20 and the self-capacitive sensor circuit 40 to generate coordinate of the points which are touched.

The driving signal generated by the driving circuit 10 can be square wave, triangular wave, sawtooth wave, or other waves according to the characteristics or requirements of the circuits. The driving signal generated by the driving circuit 10 is transmitted to the mutual-capacitive sensor circuit 20. The self-capacitive sensor circuit 40 includes a voltage source or an electric current source which is utilized to charge a node n between the mutual-capacitive sensor circuit 20 and the self-capacitive sensor circuit 40. The self-capacitive sensor circuit 40 can performs self-capacitive touch sensing during charging a voltage of node n to reach a reference voltage Vref. After the voltage of node n reaches the reference voltage Vref, the mutual-capacitive sensor circuit performs mutual-capacitive touch sensing. In other words, before the voltage of the mutual sensor circuit 20 charged to a required reference voltage Vref, the self-capacitive sensor circuit can perform self-capacitive touch sensing during the charging process so that the mutual-capacitive touch sensing and the self-capacitive touch sensing can perform at the same time. Therefore, the duration of touch sensor is shorten and the speed of touch sensor is increased.

Figure 2:
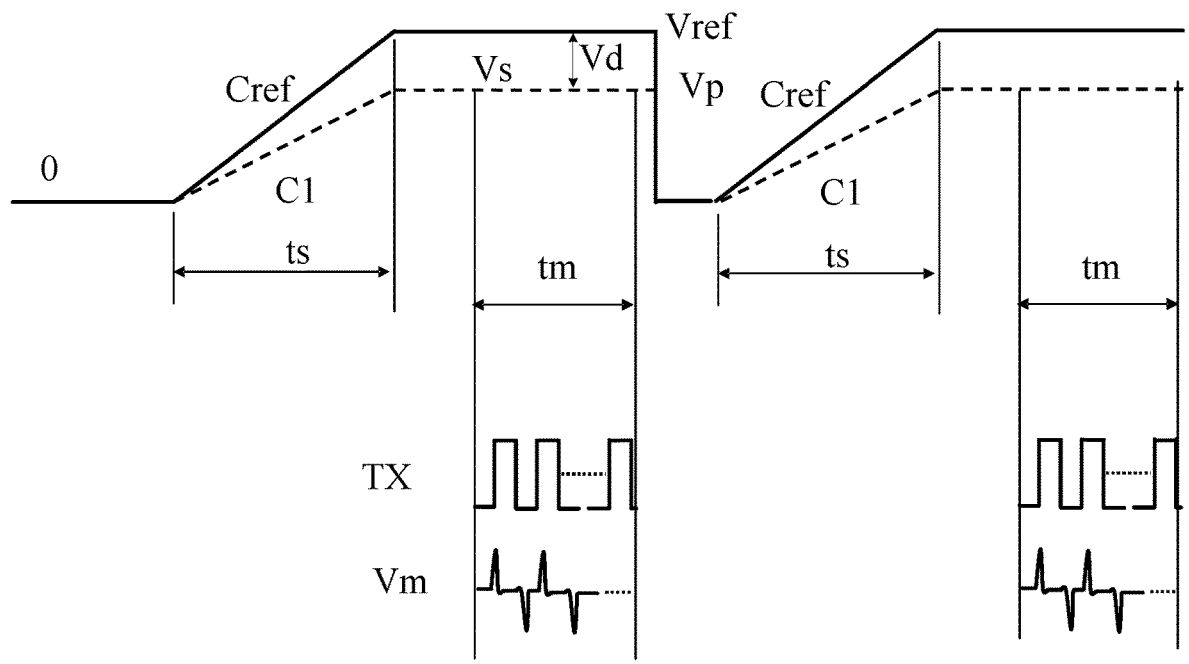
FIG. 2 illustrates a first kind of time sequence of the first embodiment of the present disclosure.

Pease refer to FIG. 2 which illustrates a time sequence chart of the touch sensor circuit of a first embodiment of the present disclosure. In the time sequence chart of the first embodiment, mutual-capacitive touch sensing can be performed when the voltage reaches Vref, self-capacitive touch sensing can be performed with the climbing voltage resulted from the charge. The detail steps of touch detection are as following. Charge the node n between the mutual-capacitive sensor circuit 20 and the self-capacitive sensor circuit 40. Detect the voltage of a first capacitor Cs of the self-capacitive sensor circuit 40 and obtain the voltage variation of the first capacitor Cs within in self-capacitive sensor period ts. As shown in FIG. 2, in the period ts for self-capacitive sensor, the voltage variation of the first capacitor Cs is Vs because initial voltage and final voltage of the first capacitor Cs during the period ts are 0 and Vs respectively. The smaller the Vs is, the larger the first capacitor Cs is. In self-capacitor touch sensing, the value of the first capacitor will increase, therefore, whether is the position corresponding to the first capacitor Cs is touched or not can be determined by the control circuit 80 by comparing the values of the first capacitor Cs and with reference capacitor vale. In the first embodiment of the present disclosure, the reference capacitor value is the value of the first capacitor when touch is not happened on the first capacitor).

After the self-capacitive sensor period ts, the voltage of node n is charged to the level as reference voltage Vref, thus mutual-capacitive touch sensor can be performed in period tm by obtaining the value of the second capacitor Cm. More particularly, the control circuit 80 calculates the value of the second capacitor Cm according to an output voltage Vm of the mutual-capacitive sensor circuit 20. In self-capacitive touch sensing, the value of second capacitor Cm decrease accompanying with the decline of Vm. Thus, the control circuit 80 determines whether touch happens on the point corresponding to the second capacitor Cm according to the variation of Vm, that is, comparing the voltage Vm with the output voltage of the mutual-capacitor sensor circuit when touch has not happened. The control circuit 80 receives voltages Vs and Vm and computes the coordinate of the points which are touched and the strength of the touch.

Figure 3:
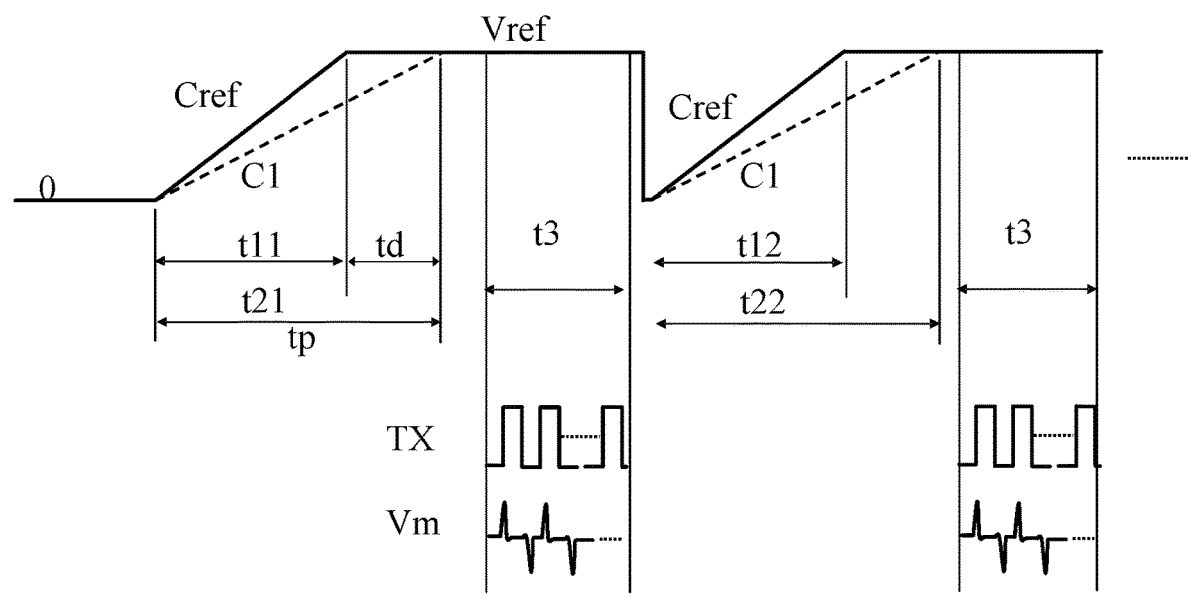
FIG. 3 illustrates a second t kind of time sequence of the first embodiment of the present disclosure.

Please refer to FIG. 3 which illustrates a second kind of time sequence of the first embodiment. The difference of the second kind of time sequence from the first kind of time sequence is what is measured in the second kind of time sequence is the time tp required for the first capacitor Cs charge to the level as reference voltage Vref. Then comparing time tp with time t11 for a reference capacitor charge to the level as reference voltage Vref to determine whether touch is happened on the point corresponding to the first capacitor Cs or not. When the voltage of node n reaches a work voltage of the mutual-capacitive sensor circuit, the mutual-capacitive touch detection is performed.

The detail steps in the second kind of time sequence of the first embodiment of the present disclosure are as follows. Charge the node n between the mutual-capacitive sensor circuit 20 and the self-capacitive sensor circuit 40. Detecting duration of time t21 which represents time required for charging voltage of the first capacitor Cs of the self-capacitive sensor circuit 40 to the level as reference voltage Vref. Time t 11 represents time required for charging the voltage of a reference capacitor (i.e. un-touched the first capacitor) to reference voltage Vref. The shorter the time required for charging to reference voltage Vref is, the smaller the value of the capacitor is. In self-capacitor touch sensing, when the point corresponding to the first capacitor Cs is touched, the value of the capacitance of the first capacitor Cs become smaller. By comparing the duration of time t11 and t21, the self-capacitive sensor circuit can determined whether touch happens on the point corresponding to the first capacitor Cs or not. When the node n is charged to required work voltage, the mutual-capacitive sensor circuit 20 outputs voltages Vm according to driving signal transmitted by driving circuit 10. During time t3 for mutual-capacitive sensor circuit, the value of the second capacitor Cm will decrease accompanying with the decrease of voltage Vm when touch happens on point corresponding to the second capacitor Cm. Therefore, control circuit 80 determines whether touch happens on point corresponding to the second capacitor Cm according to the variation of Vm (i.e, comparing Vm with the output voltage of the mutual-capacitive voltage without touch). The control circuit 80 computes the position coordinate where the touch happens and the strength of the touch.

A self-capacitive touch sensing result having higher accuracy and lower environmental affection can be obtained according to the first embodiment of the present disclosure. However, self-capacitive touch sensing can only detect the row or the line that touch happens on. For example, when multi-touch happens on position (X1, Y1) and (X2, Y2), self-capacitive touch sensing can only sense touch happens on lines X1, X2 and rows Y1, Y2. In other words, self-capacitive touch sensing cannot determine the touch happens on (X1, Y1), (X1, Y2), (X2, Y1), or (X2, Y2). Therefore, the present disclosure implement mutual-capacitive touch sensing when implementing self-capacitive touch sensing to obtain the actual coordination of the position which touch happens on. So that multi-touch actual positions can be obtained accompanying with higher accurate self-capacitive touch sensing result because of the lower environmental affection.

Figure 4:
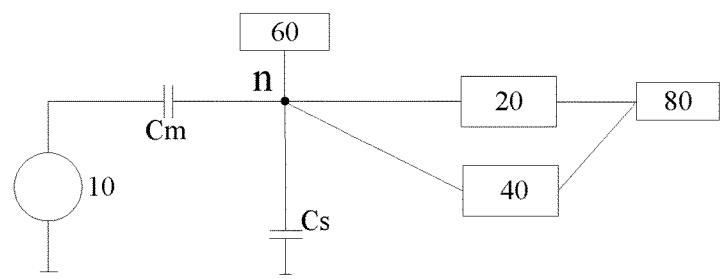
FIG. 4 illustrates a touch sensor circuit of a second embodiment of the present disclosure.

The present disclosure further includes a second embodiment as shown in FIG. 4. The touch sensor circuit includes a driving circuit 10, a mutual-capacitive sensor circuit 20, a self-capacitive sensor circuit 40, a control circuit 80 and a charging unit 60. The charging unit 60 can charge a node n to make the voltage of node n reach work voltage of the mutual-capacitive sensor circuit 20. During the charge period ts of the second embodiment, self-capacitive sensor circuit 40 can implement touch sensing by detecting voltage variation of voltage Vs of a first capacitor Cs during charge period ts as shown in FIG. 2 which illustrates the first time sequence of the first embodiment. A control circuit 80 determines whether touch happens on the point corresponding to the first capacitor Cs or not according to the voltage variation of Vs and a reference voltage Vref. In the same length of charge period ts, the lower the voltage is charged, the lager the first capacitor Cs is. In self-capacitive touch sensing, when touch happens on the point corresponding to the first capacitor Cs, the first capacitor Cs becomes larger. Hence, if voltage Vs lower than a predetermined threshold Vp or the difference between voltage Vs and Vref over a predetermined threshold Vd, it can be determined that touch happens on the point corresponding to the first capacitor Cs.

On the other hand, the self-capacitive sensor circuit 40 can implements touch sensing by detecting the time t21 for charging a voltage of the first capacitor Cs to reference voltage Vref as shown in FIG. 3 which illustrates the second time sequence of the first embodiment. The control circuit 80 determines whether touch happens on the point corresponding to the first capacitor Cs or not by comparing the length of time t21 with a time t11 that a reference capacitor charge to reference voltage Vref requires. The longer the time required for charging to reference voltage Vref is, the lager the capacitor is. In self-capacitive touch sensing, when touch happens on the point corresponding to the first capacitor Cs, the first capacitor becomes larger. Hence, the control circuit 80 will determine touch happens on the point corresponding to the first capacitor Cs when the time t21 longer than a predetermined threshold tp or the difference between time t21 and t11 larger than a predetermined threshold td.

The mutual-capacitive sensor circuit 20 implements touch sensing to output voltage Vm according to the driving signal transmitted from the driving circuit after the charging unit 60 charge the voltage of node n to work voltage. In mutual-capacitive touch sensing, the value of the second capacitor Cm will decrease accompanying with the decrease of voltage Vm if touch happens on the point corresponding to the second capacitor Cm. Therefore, the control circuit 80 determines whether touch happens to the point corresponding to the second capacitor Cm or not according to the voltage variation of Vm. The control circuit 80 further computes the position coordination and the strength of the touch according to the self-capacitive sensing result generated by the self-capacitive sensor circuit 40 and the mutual-capacitive sensing result generated by the mutual-capacitive sensor circuit 20.

It should be noticed that the charging unit 60 can be isolated from touch sensor circuit as shown in FIG. 4 which illustrates the second embodiment.

Figure 5:
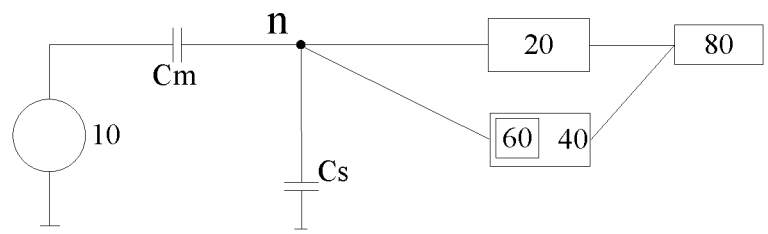
FIG. 5 illustrates a touch sensor circuit of a third embodiment of the present disclosure.

FIG. 5 illustrates a third embodiment of the present disclosure. As shown in FIG. 5, the charging unit 60 can also be disposed in the mutual-capacitive sensor circuit 40. Thus, additional space for disposing isolated the charging unit 60 can be saved.

In the second the third embodiments, the charge unit can independently charge the mutual-capacitive sensor circuit 20 so that the implement of the mutual-capacitive sensor circuit 20 will not be affected by the voltage of the first capacitor Cs in the self-capacitive sensor circuit 40. As a result, even the voltage Vs in period is becomes lower due to touch happens on the first capacitor Cs, the mutual-capacitive sensor circuit 20 still work normally because the voltage of node n will be charged to work voltage by the charging unit 60.

Figure 6:
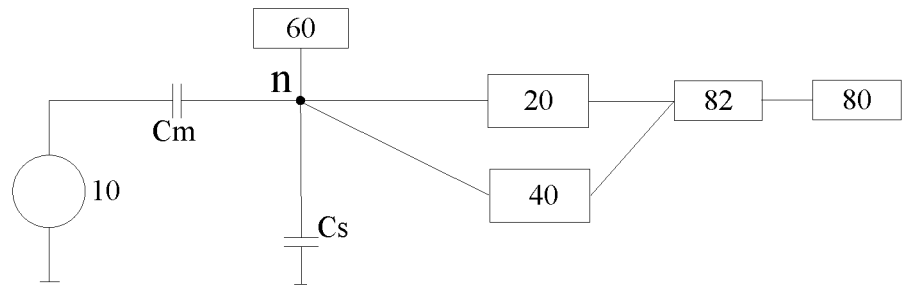
FIG. 6 illustrates a touch sensor circuit of a fourth embodiment of the present disclosure.

Please refer to FIG. 6 which illustrates the fourth embodiment of the present disclosure. A touch sensor circuit 1 of the fourth embodiment includes a driving circuit 10, a mutual-capacitive sensor circuit 20, a self-capacitive sensor circuit 40, a control circuit 80, a charging unit 60 and a convert 82. The converter 82 is utilized to convert signals generated from the mutual-capacitive sensor circuit 20 and self-capacitive sensor circuit 40 into digital signal and utilized to transmit the converted digital signals to the control circuit 80 to compute a sensing result.

By utilizing the touch sensor circuit and touch sensor method of the present disclosure, mutual-capacitive touch sensing can implement at the same time as the self-capacitive touch sensing implements so that the accuracy of multi-touch detection result is improved and mistaken touch detection can be avoid because environmental affection, such as drop, spot or dust on the touch screen, are reduced.

In the meanwhile, by utilizing the touch sensor circuit and touch sensor method of the present disclosure, the efficiency of touch detection is enhanced due to the shorter duration of touch sensing.

The present disclosure is disclosed with the best embodiments. However, the above -mentioned embodiments are utilized to exemplify rather than limit the technology concept of the present disclosure. Any modification and variation which can be completed by a skilled person in the art on the basis of the specification should fall into the scope of the claims protected by the present disclosure.

What is claimed is:

1. A touch sensor circuit, comprising:
   a driving circuit configured to generate a driving signal;
   a self-capacitive sensor circuit configured to generate a self-capacitive sensing result;
   a mutual-capacitive sensor circuit configured to generate a mutual-capacitive sensing result after receiving the driving signal when a voltage of a node between the self-capacitive sensor circuit and the mutual capacitive sensor circuit reaches a reference voltage; and
   a control circuit configured to generate a sensing result according to the self-capacitive sensing result and the mutual-capacitive sensing result.

2. The touch sensor circuit according to claim 1 further comprising a convertor configured to convert a signal from the self-capacitive sensor circuit or the mutual-capacitive sensor circuit into a digital signal.

3. The touch sensor circuit according to claim 2, wherein the convertor is connected to the self-capacitive sensor circuit, the mutual-capacitive sensor circuit and the control circuit and transmits the converted digital signal to the control circuit.

4. The touch sensor circuit according to claim 1 further comprising a charger configured to charge the node between the self-capacitive sensor circuit and the mutual- capacitive sensor circuit from the voltage to the reference voltage.

5. The touch sensor circuit according to claim 1, wherein the self-capacitive sensing result is generated according to whether a voltage of a first capacitor is lower than a first threshold or a difference between the voltage of the first capacitor and the reference voltage is higher than a second threshold.

6. The touch sensor circuit according to claim 1, wherein the self-capacitive sensing result is generated according to whether a time required for charging a first capacitor to the reference voltage is longer than a third threshold.

7. A touch sensor method, comprising:
   charging a node between a mutual-capacitive sensor circuit and a self-capacitive sensor circuit, and implementing a self-capacitor detection during charging the node;
   obtaining a voltage variation of a first capacitor by utilizing the self-capacitive sensor circuit;
   obtaining an output voltage of a second capacitor by utilizing the mutual-capacitive sensor circuit when a voltage of the node between the mutual-capacitive sensor circuit and the self-capacitive sensor circuit reaches a reference voltage; and
   obtaining a sensing result according to the voltage variation and the output voltage.

8. The touch sensor method according to claim 7 further comprising: converting the voltage variation and the output voltage into digital signals.

9. A touch sensor method, comprising: charging a node between a mutual-capacitive sensor circuit and a self-capacitive sensor circuit, and implementing a self-capacitor detection during charging the node;
- obtaining a duration required for charging a first capacitor to reach a reference voltage by utilizing the self-capacitive sensor circuit;
- obtaining an output voltage of a second capacitor by utilizing the mutual-capacitive sensor circuit when a voltage of the node between the mutual-capacitive sensor circuit and the self-capacitive sensor circuit reaches the reference voltage; and
- obtaining a sensing result according to the duration and the output voltage.

10. The touch sensor method according to claim 9 further comprising: converting the output voltage into a digital signal.

* * * * *